United States Patent
Huang

[11] Patent Number: 5,448,317
[45] Date of Patent: Sep. 5, 1995

[54] COMBINATION OF FOLDABLE GLASSES AND RIGID COMPACT CONTAINER

[75] Inventor: David Huang, Pacific Palisades, Calif.

[73] Assignee: Tamway Corporation, Culver City, Calif.

[21] Appl. No.: 406,509

[22] Filed: Mar. 20, 1995

Related U.S. Application Data

[63] Continuation of Ser. No. 125,472, Sep. 22, 1993.

[51] Int. Cl.⁶ .......... G02C 5/08; G02C 5/20; A45C 11/04
[52] U.S. Cl. .......... 351/63; 351/118; 351/158; 206/6
[58] Field of Search .......... 351/124, 126, 128, 41, 351/63, 118, 119, 158, 227; 206/5, 5 R, 6; D3/219, 263, 265, 266

[56] References Cited

U.S. PATENT DOCUMENTS

| 232,493 | 9/1880 | Hauck | 206/6 |
| 246,460 | 8/1881 | Chase | 206/6 |
| 1,528,192 | 3/1925 | Brierton | 351/118 |
| 1,936,319 | 11/1933 | Wingate | 351/63 |
| 2,275,999 | 3/1942 | Strauss | 351/63 |
| 3,419,303 | 4/1947 | Vasey | 351/118 X |
| 3,873,192 | 3/1975 | Anderson | 351/118 |

Primary Examiner—William L. Sikes
Assistant Examiner—David R. Parsons
Attorney, Agent, or Firm—Beehler & Pavitt

[57] ABSTRACT

Foldable glasses and a container combination in which the lense frames of the glasses are hinged at the bridge where they are joined for folding back parallel to each other; retractable temples are provided which are hinged to the opposite sides of the lense frames from their bridge connections, with the temples also being foldable against the lense frames to produce a minimum sized article which fits in a rigid two part container defining a cavity of an overall shape and size to receive and protect the glasses when folded.

3 Claims, 2 Drawing Sheets

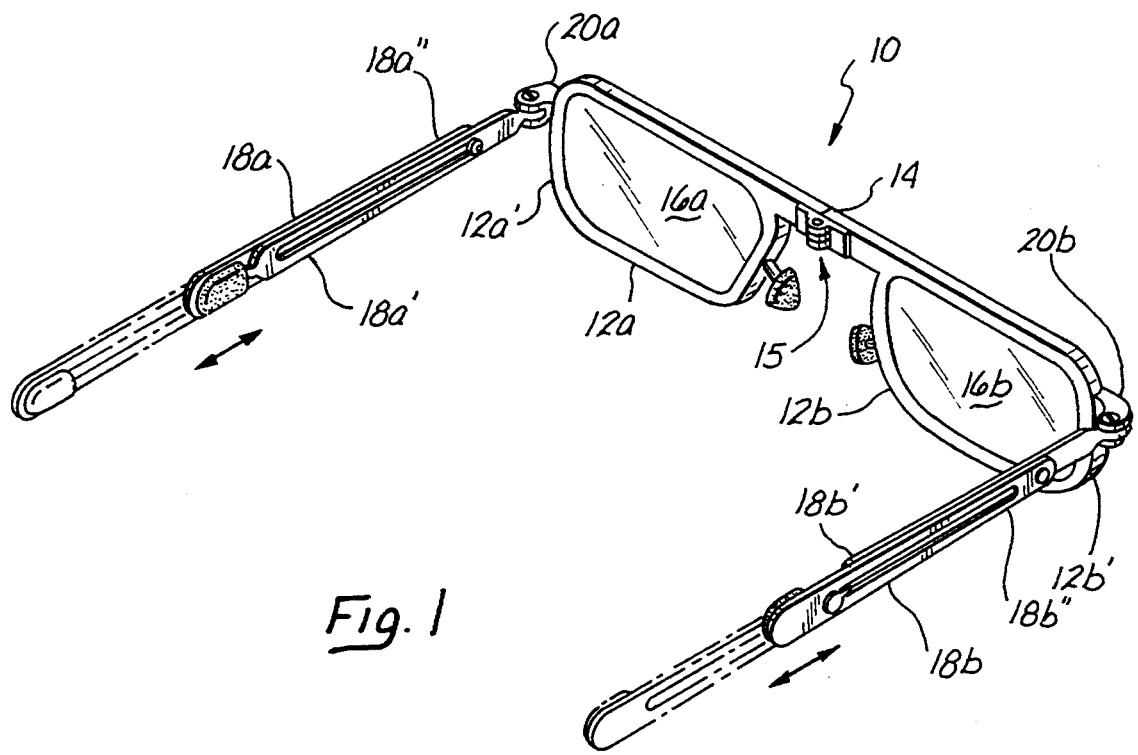
Fig. 1
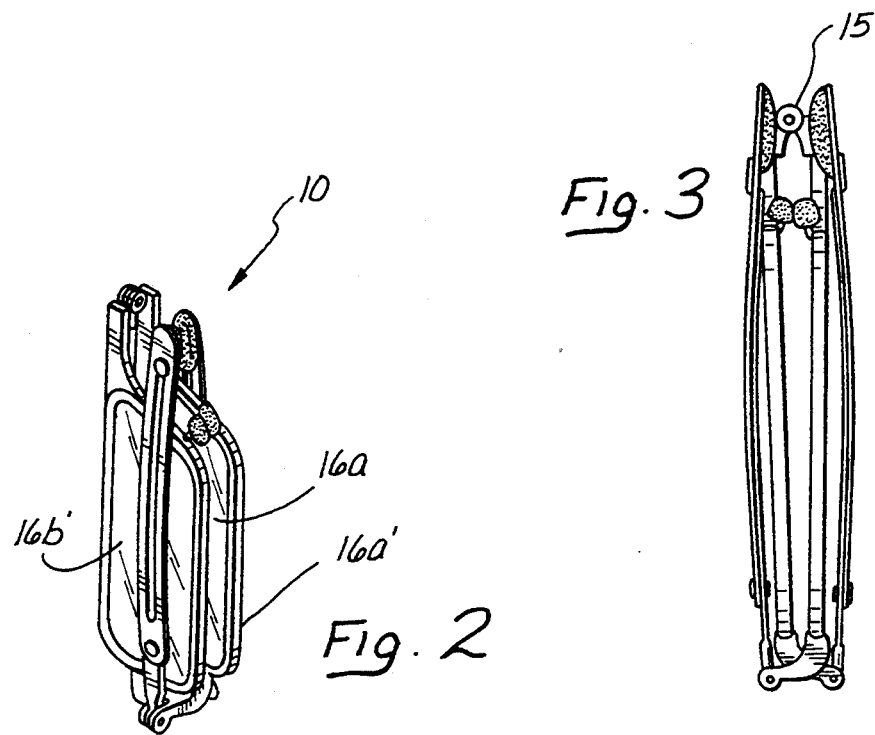
Fig. 2
Fig. 3

COMBINATION OF FOLDABLE GLASSES AND RIGID COMPACT CONTAINER

This is a continuation of application Ser. No. 08/125,472, filed Sep. 22, 1993.

FIELD OF THE INVENTION

This invention relates generally to the field of optics and, in particular to glasses of the type which may be folded to occupy a very small space for inclusion in a rigid container adapted to receive and secure the glasses against damage when so folded, with a minimum overall space requirement.

DESCRIPTION OF THE PRIOR ART

Ever since spectacles, later more popularly referred to as "glasses", have been invented, efforts have been made to reduce the amount of space which they occupy, and this has been done by providing hinging at the bridge, connecting each lenses frame; hinging the temples where they are attached to the glass frames; reducing the length of the temples by making them in sections which can be folded upon each other; and providing various configurations by which the lense frames may be folded together and the temples folded in some manner in relation to the lense frames. Typical of this prior art are the following patents:

| Pat. Nos. | Inventor(s) |
| --- | --- |
| 1,252,126 | L. Letzeisen |
| 1,925,960 | R. Guilmette |
| 1,936,319 | G. H. Wingate |
| 2,275,999 | L. Strauss |
| 2,419,303 | W. G. Casey |
| 2,573,211 | C. H. Manzler |
| 3,873,192 | Anderson |
| 4,768,872 | Fracelle et al. |
| 5,028,126 | Takeuchi |
| 5,056,907 | Weber |

While certain of these patents, such as U.S. Pat. No. 1,936,319 issued to G. H. Wingate, and U.S. Pat. No. 2,419,303 issued to W. G. Casey, U.S. Pat. No. 5,028,126 issued to Takeuchi, and U.S. Pat. No. 2,275,999 issued to L. Strauss, disclose resulting compact foldups of various forms of glasses, the present inventor is unaware of any provision having been made for a rigid container to receive any such compact foldups where the container is especially designed to accommodate fairly closely the outside configuration of the resulting foldup.

When glasses are folded into such a compact configuration, it is particularly important that the compact fold-up be protected, not only against possible breakage of the lenses, but distortion of any of the folded elements, since any such distortion could result in either the inability to unfold the glasses or some skewing of the temples with respect to the lense frames. In addition, where a container is to be provided to protect the folded glasses, it is highly desirable that it be made small enough so that the advantage of compaction by the foldup is not lost by an unnecessarily oversized carrying case. In order to protect the glasses, any such case should be extremely rigid. However, it should also be able to be conveniently opened and its cost should be substantially less than the cost of the glasses themselves.

SUMMARY OF THE INVENTION

The present invention provides for a combination of a pair of glasses which may be folded to occupy a very small space. Such folding is accomplished by hinging the bridge connecting the lense frames in such a manner that the faces of the lenses, adjacent to which the user's eyes would be disposed, are themselves brought together in face-to-face abutment. In addition, each of the temples is hinged to the outside edge of one of the lense frames so that it may be swung over and parallel to the outside face of the other lense to the frame of which the folding temple is not attached. In addition, provision is made for each temple to be sectioned so that the rear section is extendable to enable the temple better to fit over the wearer's ears, but so the rear section is telescopable with respect to the front temple section. The extent of such telescoping should be such that the length of the temple, when telescoped, is only slightly greater than the combined length of the hinge, the lense frame and the half of the bridge which is hinged at its center point. To enable the lense frames to be folded back upon each other and the telescoped temples over the outsides of the lenses, it is also important that the temples be attached at their hinges to the lense frames in such a manner that each may be folded over the opposite lenses. frame without interfering with each other.

It may be seen that glasses constructed in the manner thus described and, as hereinafter more fully explained, may occupy, when folded up, a minimum amount of space, e.g. where $1\frac{3}{4}'' \times \frac{3}{4}''$ lenses are framed, the overall length of the folded glasses may be as little as $2\frac{3}{4}''$ by $\frac{7}{8}''$ wide and $\frac{1}{2}''$ thick.

The other portion of the present invention provides a rigid container which may be molded of plastic to define a cavity only exceeding the dimensions of the folded glasses sufficiently to allow the glasses to be slipped in and out of the cavity. It is also desirable to form the cavity in such a manner that it closely follows the variances in the configuration of the folded glasses. Thus, in the example given above, while the maximum dimensions of the foldings may he those set forth, it will he appreciated that such maximum dimensions may he generally confined to the central cross sections of both the length, width and thickness of the fold-up. The cavity of the container, therefore, may have cross sections which, at certain points, are less than those maximum dimensions, in order to conform with the overall variations of the foldup.

It may also he desirable to line at least a portion of the cavity with a somewhat yieldable material. Preferably, this could he done along one or more of the side edges.

In order to enable the user of the glasses to insert and remove the glasses in the container, the latter must be formed of at least two interfitting parts which must be at least sufficiently separable to expose the cavity, for insertion in at least a portion thereof of the folded-up glasses. While this could be accomplished by providing two completely separable parts which may be slideably interlocked, it is preferred to fabricate the container in such a manner as to provide a main receiving section and a mating cap hingedly connected to one side of such main receiving section in such a manner that the cap may be swung over the open end of the cavity into which the glasses have been inserted, and seated on the edge defining such open end, with a snap action so that the cap is either held open at a 90 degree angle to the axis of the cavity or it is closed over the cavity defining section where it is held firmly and flushly until sufficient thumb or other finger force is applied to the end of the cap opposite its hinged connection, thereby to snap the cap open to provide access to the housed glasses.

When fabricated of a rigid plastic and constructed in the manner described, the case which encloses the glasses and protects them against damage, occupies very little more space than is occupied by the folded glasses themselves.

From a consideration of the foregoing and the detailed description of the combination of the present invention hereinafter provided, it will be appreciated that the present invention will have great utility in providing a protected pair of glasses which can conveniently be unfolded for use, or folded back up and slipped into a shirt or other pocket, or a small purse carried by a woman. In this connection, the outside of the small rigid container may be attractively dressed so that it will be appealing to the user.

DESCRIPTION OF THE DRAWINGS

In the accompanying drawings,

FIG. 1 is a perspective view of a foldable pair of glasses in open position.

FIG. 2 is a perspective view of the glasses of FIG. 1 after they have been folded to occupy the minimum amount of space.

FIG. 3 is an edge elevation of the glasses folded in the manner shown in FIG. 2.

DESCRIPTION OF THE PREFERRED EMBODIMENT

Figure 4:
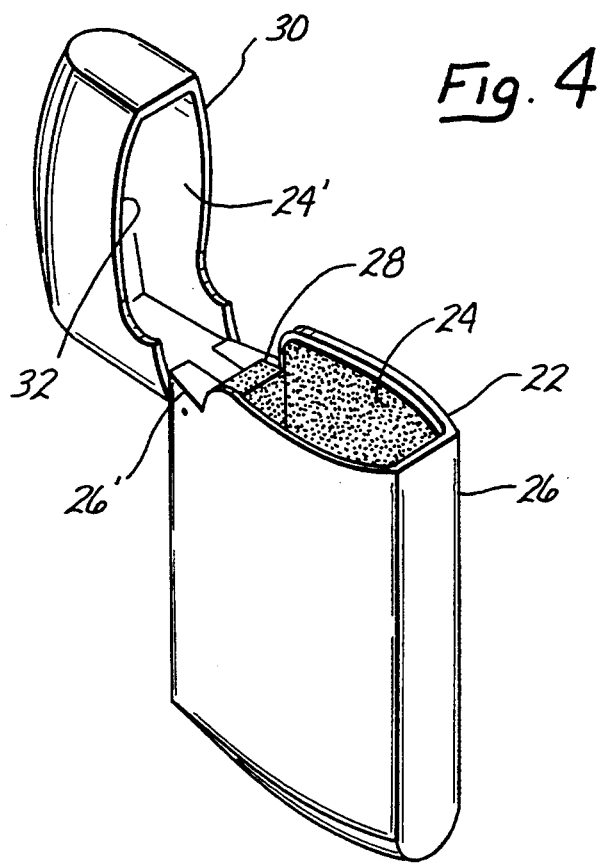
FIG. 4 is a perspective view of a rigid container defining a cavity to receive the folded glasses as shown in FIGS. 2 and 3, with the container in open position.

FIG. 1 shows a pair of foldable and retractable glasses 10 constructed of a pair of lense frames 12a and 12b which are interconnected by a hinged bridge 14. Each of the frames 12a and 12b carries a lense 16a and 16b, respectively. Retractable temples 18a and 18b are connected to the outer edges 12a', 12b' of the lense frames 12a, 12b, respectively, by hinged connections 20a, 20b. As may be seen from FIG. 1, each temple 18a, 18b is formed of a stationary element 18a', 18b' and a further element 18a'', 18b'', respectively, which is slideable relative to its respective stationary element 18a', 18b' to the extended position shown in phantom in FIG. 1.

The glasses 10 shown in FIG. 1 may be compacted to the size and configuration shown in FIG. 2 by first retracting the slideable elements 18a'', 18b'' to overlap their respective stationary elements 18a', 18b' to the position shown in full lines in FIG. 1. Following such retraction, the lense frames 12a, 12b, are brought against each other by bending the bridge 14 about the hinge 15 to dispose the back sides of the two lenses 16a, 16b in face-to-face abutment and with the temples 18a, 18b folded over the outer faces 16a', 16b' in the manner shown in FIGS. 2 and 3 It will be appreciated that when the glasses are so folded, they occupy a minimum amount of space in that their length is equal to the length of the temples 18a, 18b when retracted; their height, equal to that of the lense frames 12a, 12b; and their thickness, only slightly greater than the space occupied by the lenses 16a, 16b since they are partially covered by the retracted temples 18a, 18b.

Figure 5:
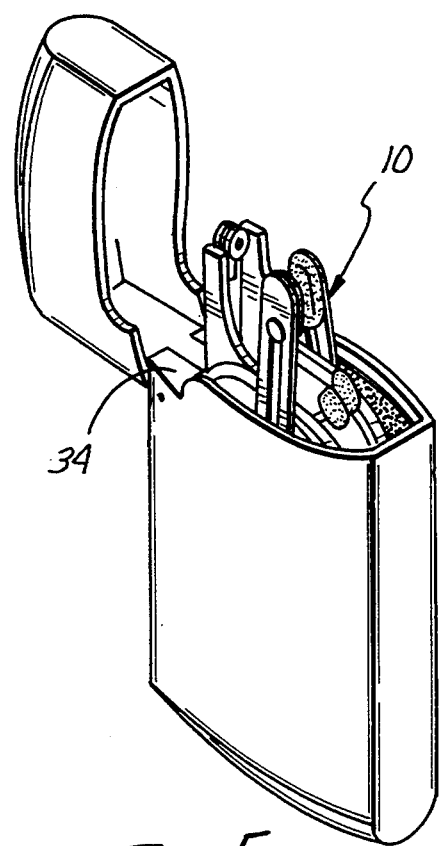
FIG. 5 is a view similar to FIG. 4, but showing the glasses inserted therein.

While it may be desirable to have the glasses 10 retracted and folded to the size and configuration shown in FIGS. 2 and 3, it is also desirable to have the thus folded glasses protected against any type of crushing which would result in a bending of the temples 18a, 18b, or of the frames 12a, 12b, which bending could result in a distortion of the alignment of the temples 18a, 18b and the lense frames 12a, 12b when the glasses are opened up for use. It is therefore contemplated in the present invention to provide a small rigid receptacle 22 for the glasses 10 when thus retracted and folded. To this end, a rigid receptacle 22, which may be molded of plastic such as polystyrene, may be provided to define a cavity 24 which is configured to receive the glasses 20 when folded as shown in FIG. 5. At least a portion of the receptacle walls 26 which define the cavity may be provided with a cushioning liner 28. The size of the cavity 24 defined by the walls, desirably should be such as to fit closely enough about the folded glasses 10, yet to permit them to be easily withdrawn from the cavity 24.

It is also a feature of the present invention to provide a closure 30 for the container, such closure having walls 32 which define a smaller complimentary cavity 24 to receive a portion of the folded glasses 10. Desirably this closure 30 should be attached to the upper edge 26' of the container 26 by a snap-on arrangement similar to those which are frequently found in cigarette lighters. The closure 30 desirably should be molded in such a configuration that when it is closed as shown in FIG. 6, it mates with the container 26 flushly along its edges where it is brought over one end of the glasses 10 to abut the upper edges of the container 26.

Figure 6:
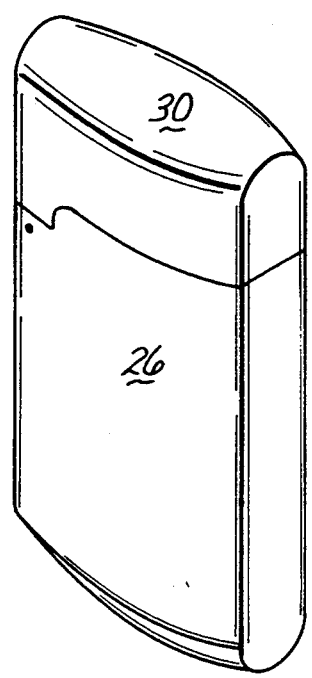
FIG. 6 is a view similar to FIGS. 4 and 5 showing the container in closed position.

As so thus constructed, it will be appreciated that the glasses 10 may be retracted and folded to a minimum size and in a configuration, as illustrated in FIG. 5, for protective retention when the cover 30 is snapped over and placed in abutment with the container (see FIG. 6). The result is to enable any person, and particularly women, to carry glasses having a special function, such as for reading, protectedly occupying a minimum amount of space, which may be available in a smaller purse of a woman, or in the shirt or jacket of a man. At any time, the owner of the glasses may need to use them, he or she need only pick up the container 26, unsnap its top cover 30, remove the glasses 10, and unfold the lense frames and extend the temples. Conversely, when the user is through with the glasses, they may be rapidly retracted, folded, inserted in the container, and the cover snapped over the latter, at which point the container with the glasses may be slipped back into a shirt pocket or a purse.

I claim:

1. In combination,
   (A) A foldable pair of glasses, said glasses comprising a pair of lenses frames each carrying a lense having a front face and a rear face, said frame being disposed in side-by-side relationship and laterally connected to each other at a first side of each lense frame by a bridge, said bridge being hinged at its center to enable said lense frames to be folded rearwardly to a disposition closely parallel to each other, the combined length of each said frame and the extent of the bridge to its hinge center being of a first predetermined length; the second side of each lense frame being hingedly connected to a rearwardly extending temple, each temple being formed of a stationary temple element having a first elongated closed ended slot formed therethrough and a slideable temple element having a second closed ended slot formed therethrough, said stationary temple element having a first rivet formed on one end thereof for captured slideable engagement within said second elongated closed ended slot and said slideable temple element having a second rivet formed on one end thereof for captured slideable engagement within said first elongated closed ended slot, said stationary temple element and said slideable temple element being coupled in sliding relation each to the other, each temple being adapted to provide a length which, when combined with the temple's hinged connection, approximates said first predetermined length, and each said temple being foldable at its hinged connection about the outer face of the other lense to which it is not hingedly connected and disposed to avoid interference with the folding of the temple and hinge of the other lense frame; whereby said lenses frames, with their lenses, may be folded to dispose their rear faces against each other and the temple and its hinged connection for each lense frame may be folded over the other lense frame and front face of its lense for parallel disposition thereagainst to produce a folded pair of glasses of an overall predetermined configuration having a length approximating said first predetermined length, a predetermined width and a minimal predetermined thickness;

(B) A container for said thus folded pair of glasses, said container comprising a rigid wall defining a cavity having a configuration of the same shape as, but slightly greater than the configuration of said article, said wall being comprised of two interfitting parts separable from each other to allow insertion of the folded pair of glasses into the cavity, the first of said interfitting parts including that portion of the wall defining such extent of the cavity as to house most of the folded pair of glasses when inserted in said cavity, the last said portion having an open end and a closed end; and the second of said parts comprising an end cap defining the balance of the cavity to house the remainder of the folded pair of glasses when the cap is interfitted with the open end of the first of said parts; said interfitting parts each having opposed first sides the width dimensions of which are greater than the height of the lenses and narrower second sides joining the first sides, said second sides being of greater width than the combined thickness of the two lenses when folded against each other; and disposed at the open end of the first of said parts hingedly to connect a second side of said first part with a second side of the end cap, the hinge axis being normal to the lenses of the folded pair of glasses when inserted in the cavity in the first of said interfitting parts.

2. In combination, (A) A foldable pair of glasses, said glasses comprising a pair of lense frames, each carrying a lense having a front face and a rear face, said frames being disposed in side-by-side relationship and laterally connected to each other at a first side of each lense frame by a bridge, said bridge being hinged at its center to enable said lense frames to be folded rearwardly to a disposition closely parallel to each other, the combined length of each said frame and the extent of the bridge to its hinged center being of a first predetermined length; the second side of each lense frame being hingedly connected to a rearwardly extending temple, each temple being formed of a stationary temple element having a first elongated closed ended slot formed therethrough and a slideable temple element having a second closed ended slot formed therethrough, said stationary temple element having a first rivet formed on one end thereof for captured slideable engagement within said second elongated closed ended slot and said slideable temple element having a second rivet formed on one end thereof for captured slideable engagement within said first elongated closed ended slot, said stationary temple element and said slideable temple element being coupled in sliding relation each to the other, each temple being adapted to provide a length which, when combined with the temple's hinge connection, approximates said first predetermined length, and each said temple being foldable at its hinged connection to a position adjacent a face of the other lense to which it is not hingedly connected and disposed to avoid interference with the folding of the temple and hinge of the other lense frame; whereby said lense frames, with their lenses, may be folded with their respective temples for parallel disposition to produce an article of an overall predetermined configuration having a length approximating said first predetermined length, a predetermined width and a predetermined thickness;

(B) A container for said thus folded pair of glasses, said container comprising a rigid wall defining a cavity having a configuration of the same shape as, but slightly greater than the configuration of said folded pair of eyeglasses, said wall being comprised of two interfitting parts separable from each other to allow insertion of the folded pair of glasses into the cavity, the first of said interfitting parts including that portion of the wall defining such extent of the cavity as to house most of the folded pair of glasses when inserted in said cavity, the last said portion having an open end and a closed end; and the second of said parts comprising an end cap defining the balance of the cavity to house the remainder of the folded pair of glasses when the cap is interfitted with the open end of the first of said parts; said interfitting parts each having opposed first sides the width dimensions of which are greater than the height of the lenses and narrower second sides joining the first sides, said second sides being of greater width than the combined thickness of the two lenses when folded against each other; and disposed at the open end of the first of said parts hingedly to connect a second side of said first part with a second side of the end cap, the hinge axis being normal to the lenses of the folded pair of glasses when inserted in the cavity in the first of said interfitting parts.

3. A foldable pair of glasses, said glasses comprising a pair of lenses frames, each carrying a lense having a front face and a rear face, said frames being disposed in side-by-side relationship and laterally connected to each other at a first side of each lense frame by a bridge, said bridge being hinged at its center to enable said lense frames to be folded rearwardly to a disposition closely parallel to each other, the combined length of each said frame and the extent of the bridge to its hinged center being of a first predetermined length; the second side of each lense frame being hingedly connected to a rearwardly extending temple, each temple being formed of a stationary temple element having a first elongated closed ended slot formed therethrough and a slideable temple element having a second closed ended slot formed therethrough, said stationary temple element having a first rivet formed on one end thereof for captured slideable engagement within said second elongated closed ended slot and said slideable temple element having a second rivet formed on one end thereof for captured slideable engagement within said first elongated closed ended slot, said stationary temple element and said slideable temple element being coupled in sliding relation each to the other, each temple being adapted to provide a length which, when combined with the temple's hinge connection, approximates said first predetermined length, and each said temple being foldable at its hinged connection to a position adjacent a face of the other lense to which it is not hingedly connected and disposed to avoid interference with the folding of the temple and hinge of the other lense frame; whereby said lense frames, with their lenses, may be folded with their respective temples for parallel disposition to produce an article of an overall predetermined configuration having a length approximating said first predetermined length, a predetermined width and a predetermined thickness.

* * * * *